(12) United States Patent
Tsai et al.

(10) Patent No.: US 10,893,177 B2
(45) Date of Patent: Jan. 12, 2021

(54) ELECTRONIC DEVICE WITH RETRACTABLE CAMERA MODULE

(71) Applicant: Chiun Mai Communication Systems, Inc., New Taipei (TW)

(72) Inventors: Shih-Kuo Tsai, New Taipei (TW); Chia-Hsin Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/701,451

(22) Filed: Dec. 3, 2019

(65) Prior Publication Data

US 2020/0177779 A1 Jun. 4, 2020

(30) Foreign Application Priority Data

Dec. 3, 2018 (CN) .......................... 2018 1 1467376

(51) Int. Cl.
*H04N 5/225* (2006.01)
*H04M 1/02* (2006.01)

(52) U.S. Cl.
CPC .... *H04N 5/225251* (2018.08); *H04M 1/0264* (2013.01); *H04N 5/2252* (2013.01); *H04N 5/2256* (2013.01); *H04N 5/2257* (2013.01); *H04M 2250/20* (2013.01)

(58) Field of Classification Search
CPC ........... H04M 1/0208; H04M 2250/20; H04M 1/0264; H04M 1/0237; H04M 1/026; H04M 1/0266; H04M 1/0249; H04N 5/2251; H04N 5/225251; H04N 5/2256; H04N 5/2257; H04N 5/2252
See application file for complete search history.

(56) References Cited

U.S. PATENT DOCUMENTS

| | | | |
|---|---|---|---|
| 7,435,018 B2 * | 10/2008 | Huang | G03B 17/04 348/373 |
| 10,444,802 B2 * | 10/2019 | Zeng | H04M 1/0237 |
| 2006/0261257 A1 * | 11/2006 | Hwang | H04N 5/2259 250/216 |

(Continued)

FOREIGN PATENT DOCUMENTS

| | | |
|---|---|---|
| CN | 204392320 U | 6/2015 |
| CN | 207706302 U | 8/2018 |
| CN | 108848296 A | 11/2018 |

OTHER PUBLICATIONS

EPO Machine Translation of CN 108848296 A , 2020 (Year: 2020).*

*Primary Examiner* — Timothy J Henn
(74) *Attorney, Agent, or Firm* — ScienBiziP, P.C.

(57) ABSTRACT

A camera module in an electronic device which is retracted in the body of the device until deployed includes a drive assembly, a camera assembly, and a first connecting rod. The drive assembly includes a driver and a first member. The first connecting block connects to the driver, the driver can drive the first connecting block toward or away from the driver. The camera assembly comprises a camera bracket and a second connecting block connected to the camera bracket. The first connecting rod connects to the first and second connecting blocks, the first connecting block can drive the first connecting rod to move in a circular motion during the linear movement of the first connecting block, causing the camera bracket to be received in the body or deployed out.

10 Claims, 7 Drawing Sheets

(56) References Cited

U.S. PATENT DOCUMENTS

2007/0267108 A1* 11/2007 Ogura .................. C22C 19/03
                                                                148/402
2019/0173986 A1*  6/2019 Xu ..................... H04M 1/0208
2019/0253536 A1*  8/2019 Fan .................... H04M 1/0264
2019/0302841 A1* 10/2019 Sun ..................... G06F 1/1626
2020/0084307 A1*  3/2020 Gong .................. H04N 5/2257

* cited by examiner

ELECTRONIC DEVICE WITH RETRACTABLE CAMERA MODULE

FIELD

The disclosure generally relates to an electronic device with retractable camera module.

BACKGROUND

A screen-to-body ratio of an electronic device, namely a ratio of the screen area to the area of a front surface of the electronic device, reflects a compact degree of a structural design and affects an appearance of the electronic device. An electronic device with an increased screen-to-body ratio is preferred. However, the increase of the ratio makes it difficult to install the camera above the screen. So there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
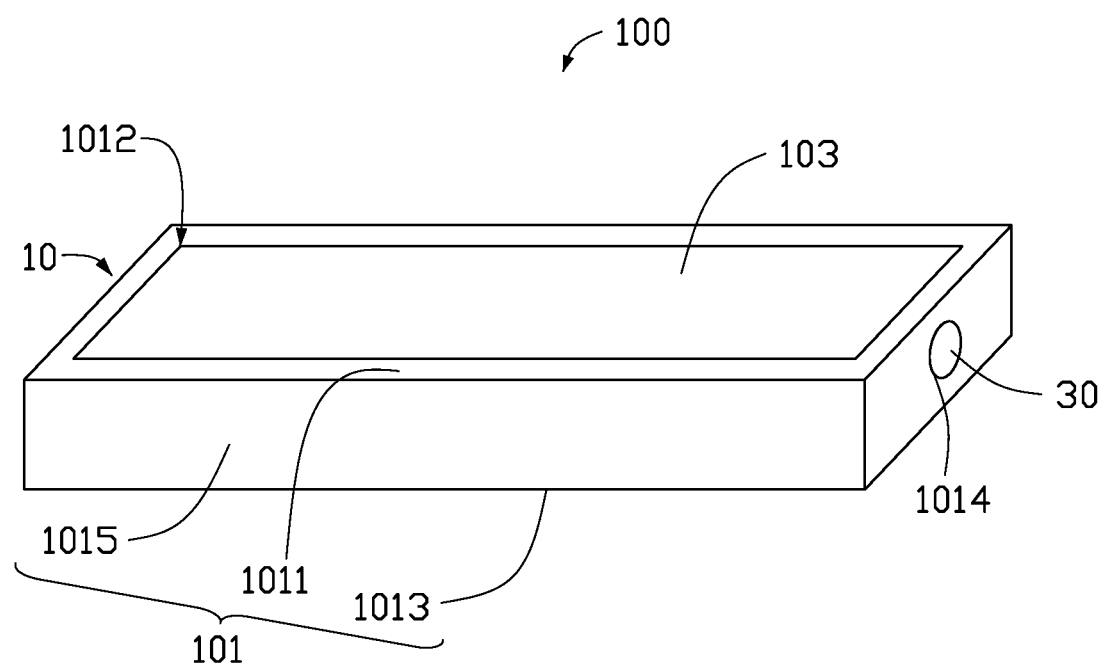
FIG. 1 is a perspective view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

The term "comprising" when utilized, means "include, but is not limited to"; it specifically indicates open-ended inclusion or membership in the so-described combination, group, series and the like. The term "coupled" when utilized, means "either a direct electrical connection between the things that are connected, or an indirect connection through one or more passive or active intermediary devices, but is not limited thereto".

FIG. 1 illustrates an embodiment of an electronic device 100. The electronic device 100 can be, but is not limited to, a mobile phone, and a tablet computer.

In some embodiments, the electronic device 100 includes a body 10 and a camera module 30.

The body 10 includes a housing 101 and a display screen 103.

The housing 101 includes a front housing portion 1011, a rear housing portion 1013, and a frame portion 1015. The frame portion 1015 surrounds a periphery of the rear housing portion 1013. The front housing 1011 portion is positioned at an end of the frame portion 1015 away from the rear housing portion 1013. The front housing portion 1011 defines a notch 1012 for receiving the display screen 103.

Figure 2:
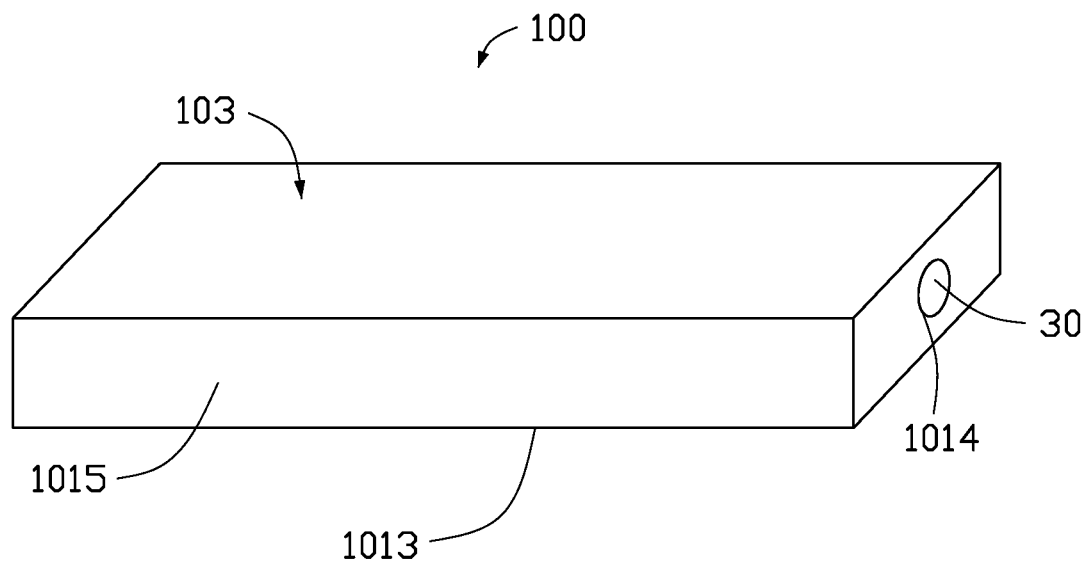
FIG. 2 is a perspective view of another embodiment of an electronic device.
Figure 3:
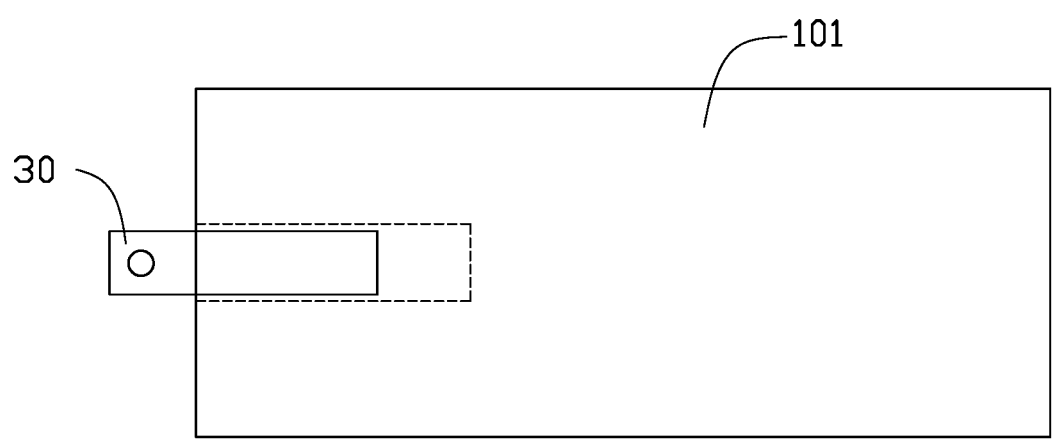
FIG. 3 is a side view of the electronic device in FIG. 2.

Referring to FIGS. 2 and 3, in some embodiments, the electronic device 100 is a full-screen device, that is, the front housing portion 1011 can be omitted. The display screen 103 is positioned at the end of the frame portion 1015 away from the rear housing portion 1013.

Further, the frame portion 1015 defines an opening 1014. The display screen 103 and the opening 1014 are positioned on different surfaces of the housing 101. In some embodiments, the display screen 103 is positioned on the front housing portion 1011, and the opening 1014 is defined on the frame portion 1015. The camera module 30 is movably received in the body 10 through the opening 1014.

Figure 4:
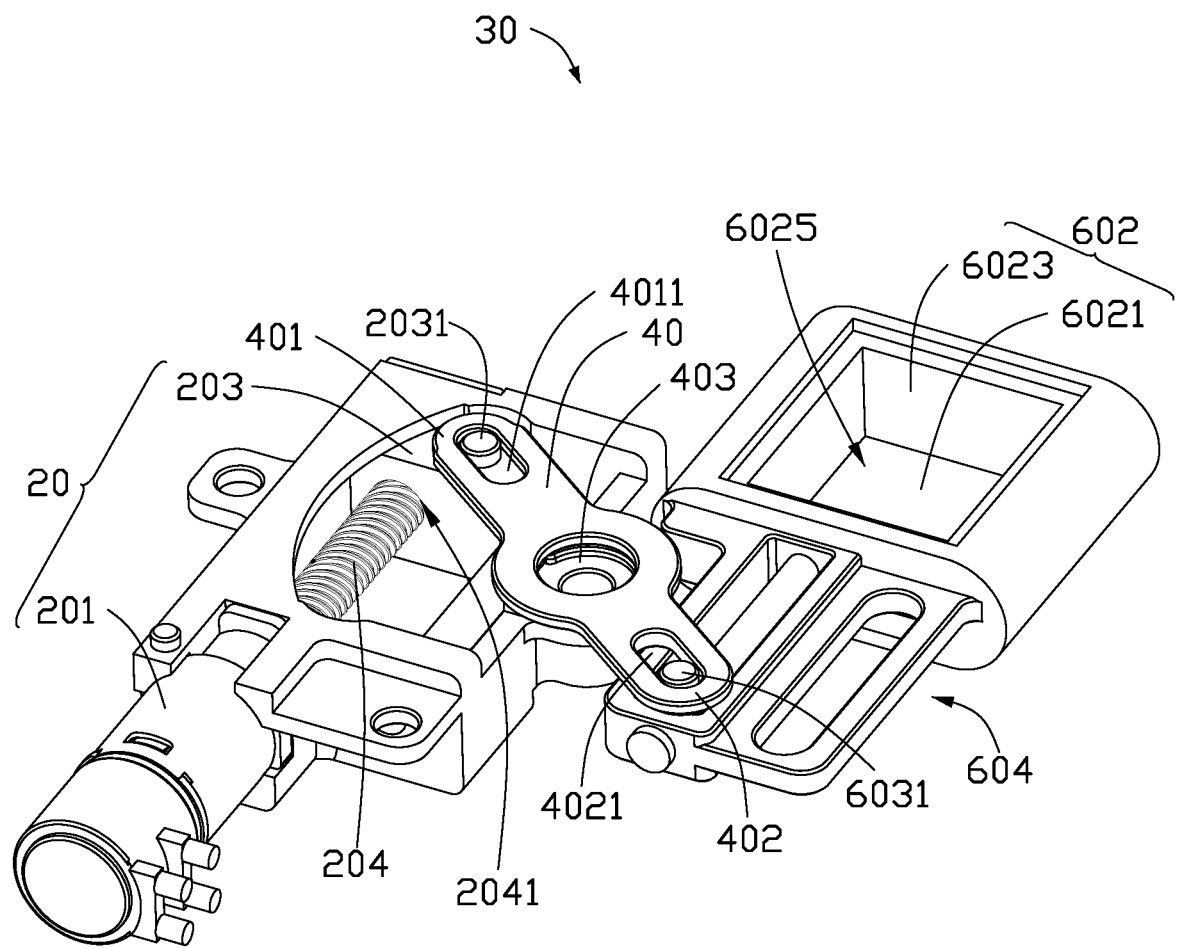
FIG. 4 is a perspective view of an embodiment of a camera module of the electronic device of FIG. 1.
Figure 5:
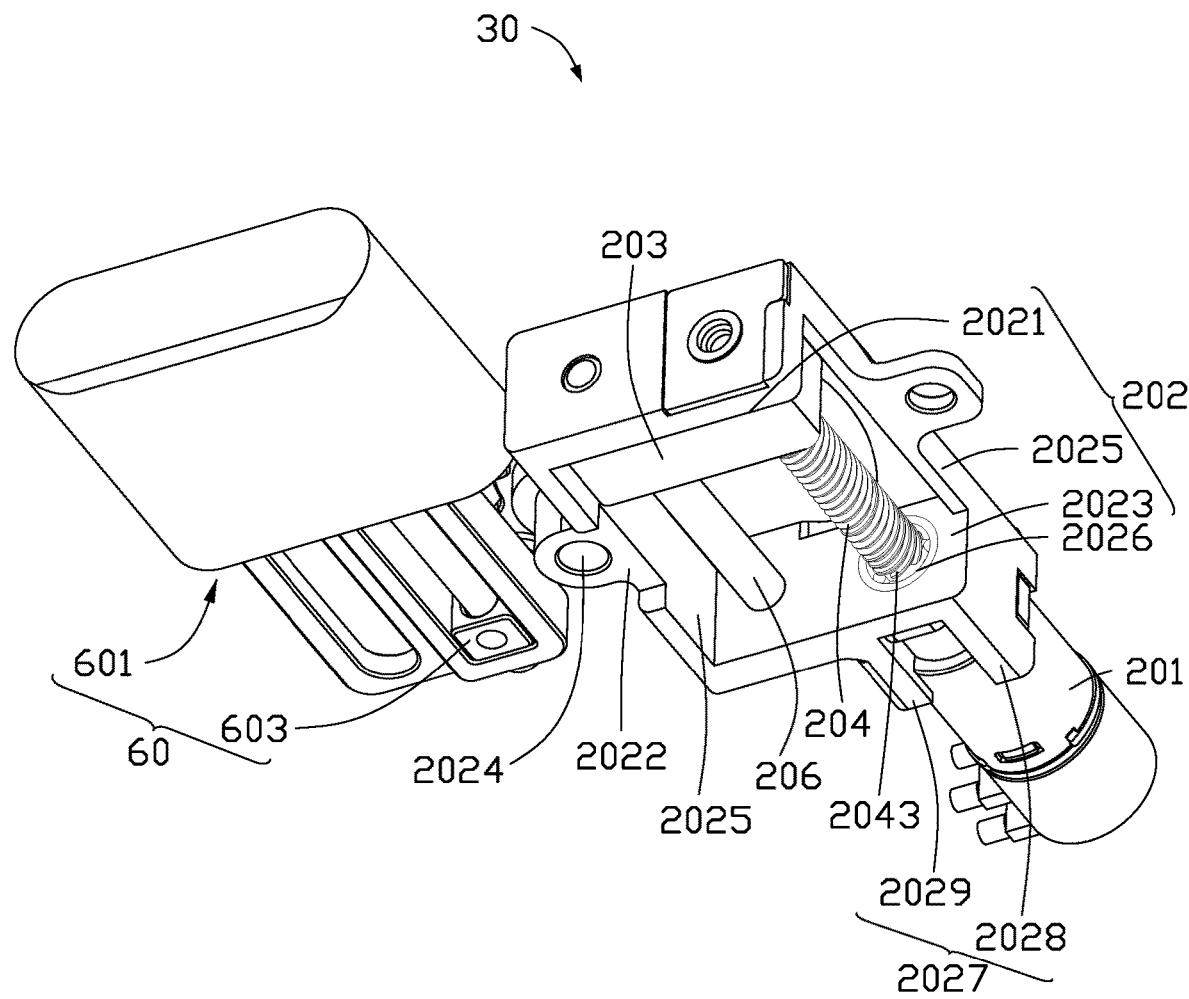
FIG. 5 is a perspective view of the camera module of FIG. 4 from another angle.

Referring to FIGS. 4 and 5, the camera module 30 includes a drive assembly 20, a first connecting rod 40, and a camera assembly 60.

The drive assembly 20 includes a driver 201 and a first connecting block 203. The first connecting block 203 is connected to the driver 201, so that the first connecting block 203 can be linearly moved toward or away from the driver 201 when driven by the driver 201. In some embodiments, the driver 201 is a stepping motor.

In some embodiments, the drive assembly 20 further includes a bracket 202 and a screw rod 204.

Referring to FIG. 5, the bracket 202 includes a top wall 2021, a first bottom wall 2023, and two side walls 2025. The top wall 2021 and the first bottom wall 2023 face each other, and the two side walls face each other. The two side walls 2025 are positioned between the top wall 2021 and the first bottom wall 2023, and connected to the top wall 2021 and the first bottom wall 2023 to form the bracket 202. The bracket 202 is rectangular.

In some embodiments, the bracket 202 is fixedly positioned in the body 10. A lug 2022 is positioned on each of the side walls 2025. Each of the lugs 2022 define a first through hole 2024. Thus, a bolt (not shown) can be passed through the first through hole 2024 to fix the bracket 202 to the body 10. In other embodiments, the bracket 202 can also be positioned in the body 10 by gluing, welding, or as a snapfit.

Referring to FIGS. 4 and 5, the screw rod 204 includes a first end 2041 and a second end 2043 opposite to the first end 2041. The first end 2041 is positioned on the top wall 2021, and the second end 2043 is positioned on the first bottom wall 2023. The screw rod 204 is rotatable relative to the bracket 202. The screw rod 204 passes through the first connecting block 203. A surface of the screw rod 204 has first screw threads, and a surface of the first connecting block 203 in contact with the screw rod 204 has second screw threads that match the first screw threads. As such, the first connecting block 203 can be linearly moved toward or away from the driver 201 when driven by the screw rod 204.

Further, in some embodiments, the drive assembly 20 further includes a guiding post 206. One end of the guiding post 206 is fixed to the top wall 2021, and the other end of the guiding post 206 is fixed to the first bottom wall 2023. The guiding post 206 is parallel to the screw rod 204. The guiding post 206 passes through the first connecting block 203 to guide the first connecting block 203, and prevents the first connecting block 203 from being displaced during the movement.

The first bottom wall 2023 of the bracket 202 defines a second through hole 2026. The driver 201 is connected to one end of the screw rod 204 through the second through hole 2026. In some embodiments, the driver 201 is connected to the second end 2043 of the screw rod 204. As such, the screw rod 204 is rotatable relative to the bracket 202 under the driving of the driver 201, and drives the first connecting block 203 to move on the screw rod 204.

In one embodiment, the driver 201 can be positioned on the surface of the first bottom wall 2023 away from the top wall 2021 by screws or glue.

In some embodiments, a protruding portion 2027 extends from a surface of the first bottom wall 2023 away from the top wall 2021. The protruding portion 2027 includes a first fixing portion 2028 and a second fixing portion 2029. The first fixing portion 2028 and the second fixing portion 2029 face each other. The first fixing portion 2028 and the second fixing portion 2029 are located at two sides of the second through hole 2026, so that the driver 201 is engaged between the first fixing portion 2028 and the second fixing portion, to ensure that the driver 201 can be connected to the second end 2043 of the screw rod 204 through the second through hole 2026.

Referring to FIG. 4, in some embodiments, a first protrusion 2031 protrudes from a surface of the first connecting block 203. The first connecting block 203 is connected to the first connecting rod 40 through the first protrusion 2031.

The first connecting rod 40 includes a first connecting end 401, a second connecting end 402 opposite to the first connecting end 401, and a center hole 403. The center hole 403 is defined on the first connecting rod 40, and is between the first connection end 401 and the second connection end 402. The first connecting rod 40 is positioned in the body 10 by the center hole 403, and the first connecting rod 40 can move in a circular motion around the center hole 403. In some embodiments, the first connecting rod 40 is positioned on the bracket 202. A mounting member (not shown) is passed through the center hole 403, and the first through hole 2024 of one of the lugs 2022, to position the first connecting rod 40 on the bracket 202, so that the connecting rod 40 can move in the circular motion around the center hole 403.

The first connecting end 401 defines a first connecting hole 4011. The first connecting rod 40 is connected to the first protrusion 2031 of the first connecting block 203 through the first connecting hole 4011. Thus, when the first connecting block 203 moves on the screw rod 204, the first connecting end 401 of the first connecting rod 40 is driven to move toward or away from the driver 201. At the same time, the second connecting end 402 of the first connecting rod 40 moves away from or toward the driver 201.

The camera assembly 60 includes a camera bracket 601 and a second connecting block 603. The second connecting block 603 is positioned on the camera bracket 601 and connected to the second connecting end 402 of the first connecting rod 40, so that the camera bracket 601 can be linearly moved toward or away from the driver 201 when driven by the first connecting rod 40.

The camera bracket 601 further includes a camera bracket body 602 and a connecting portion 604.

The camera bracket body 602 includes a second bottom wall 6021 and a peripheral wall 6023. The peripheral wall 6023 surrounds a periphery of the second bottom wall 6021 to form an accommodating portion 6025 with the second bottom wall 6021. The accommodating portion 6025 can be used for receiving a camera (not shown).

The connecting portion 604 is positioned on a surface of the peripheral wall 6023 away from the second bottom wall 6021.

Figure 6:
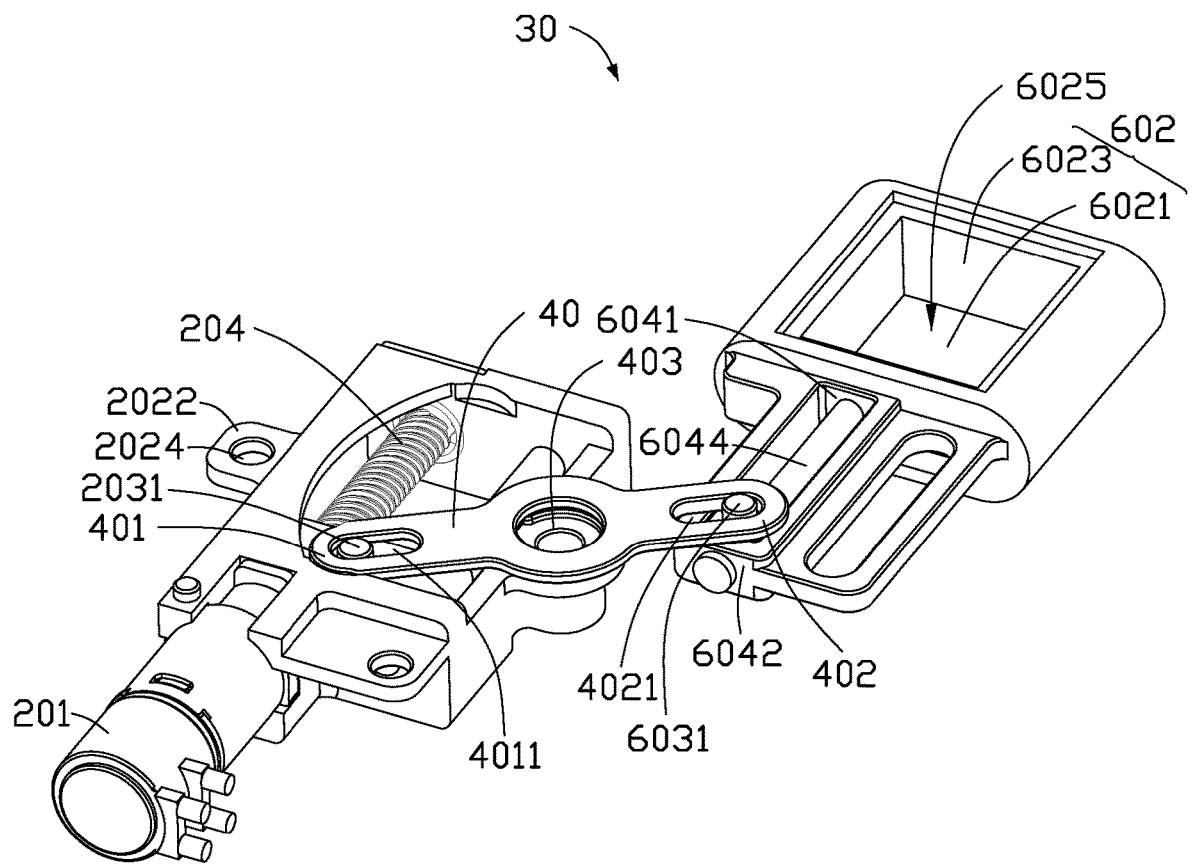
FIG. 6 is a perspective view of the camera module in FIG. 4 in another state.

Referring to FIGS. 4 and 6, in one embodiment, the second connecting block 603 is fixedly positioned at an end of the connecting portion 604 away from the camera bracket body 602, so that the camera bracket 601 can be linearly moved toward or away from the driver 201 under the action of the first connecting rod 40.

Figure 7:
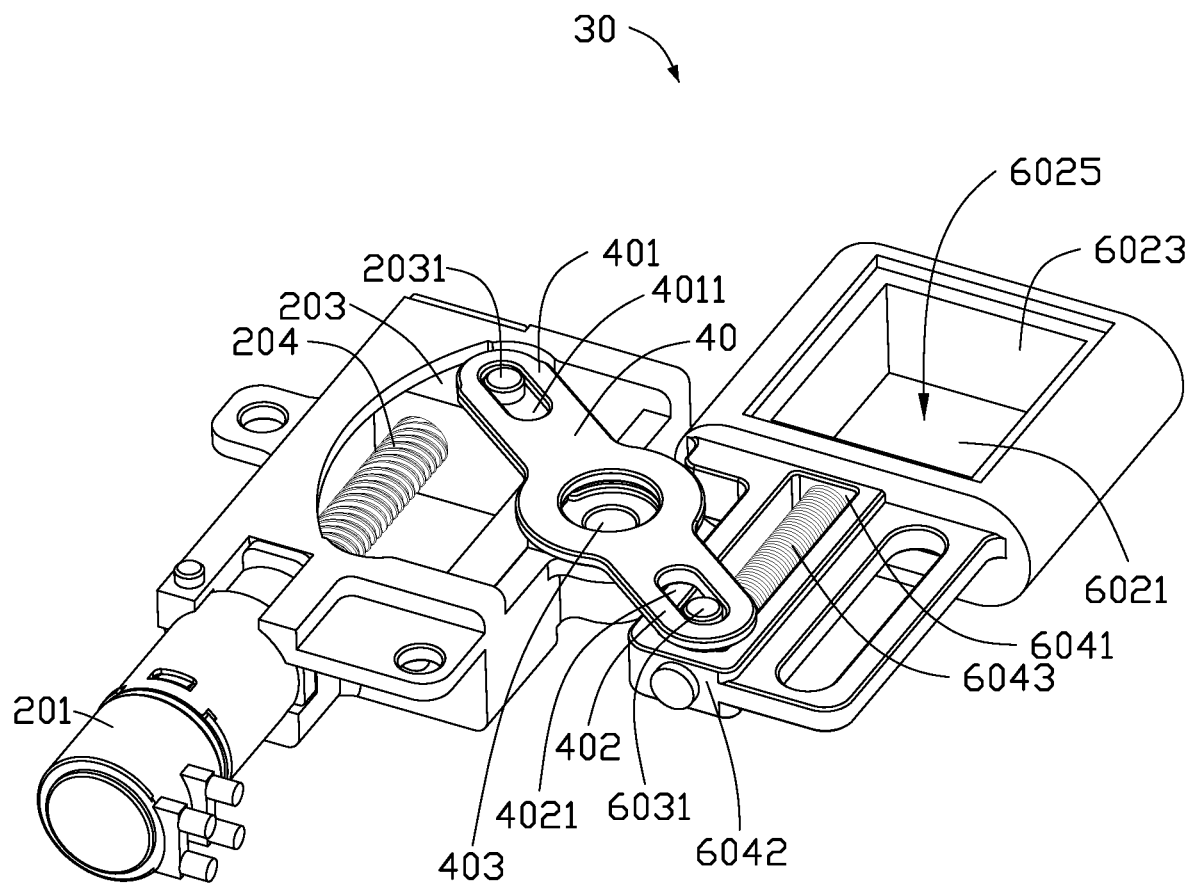
FIG. 7 is a perspective view of another embodiment of a camera module.

Referring to FIG. 7, in some embodiments, the second connecting block 603 is slidably connected to the connecting portion 604.

Referring to FIGS. 6 and 7, the connecting portion 604 includes a first wall 6041, a second wall 6042, a spring 6043, and a second connecting rod 6044. The first wall 6041 and the second wall 6042 face each other. In some embodiment, the first wall 6041 may be a part of the peripheral wall 6023. One end of the second connecting rod 6044 is connected to the first wall 6041, and the other end is connected to the second wall 6042. The second connecting rod 6044 passes through the second connecting block 603. The second connecting block 603 can slide relative to the second connecting rod 6044. The spring 6043 wraps the second connecting rod 6044 and is located between the first wall 6041 and the second connecting block 603. Correspondingly, a surface of the second connecting block 603 has a second protrusion 6031. The second connecting block 603 is connected to the second connecting hole 4021 of the first connecting rod 40 through the second protrusion 6031. As such, when the second connecting end 402 of the first connecting rod 40 moves toward the camera bracket body 602, the first connecting rod 40 can drive the second connecting block 603 to move toward the first wall 6041. Then, the second connecting block 603 pushes the spring 6043, so that the camera bracket body 602 moves away from the driver 201 and is exposed out of the body 10 through the opening 1014. When the second connecting end 402 of the first connecting rod 40 moves away from the camera bracket body 602, the first connecting rod 40 can drive the second connecting block 603 to move toward the second wall 6042. Until the second connecting block 603 meets the second wall 6042, the connecting portion 604 will be pushed to move the camera bracket body 602 toward the driver 201, and is hidden in the body 10 through the opening 1014.

In some embodiments, the first connection hole 4011 and the second connection hole 4021 are all elliptical holes. In other embodiments, the first connection hole 4011 and the second connection hole 4021 may be longitudinal holes.

Working principle of the camera module 30 is:

Referring to FIG. 7, firstly, when the camera module 30 is received in the body 10, the first connecting block 203 is located on the top wall 2021 of the bracket 202, and the first protrusion 2031 is located in the one end of the second connection hole 4021 away from the first connecting 4011. The second connecting block 603 is located at the second wall 6042 of the connecting portion 604, and the second protruding portion 6031 is located at the end of the second connecting hole 4021 away from the first connecting hole 4011.

Under the action of the driver 201, the screw rod 204 is rotated to drive the first connecting block 203 to move toward the first bottom wall 2023. When the first connecting block 203 moves to the middle of the screw rod 204, the first protrusion 2031 moves to an end of the first connecting hole 4011 near the second connecting hole 4021. At the same time, the first connecting end 401 of the first connecting rod 40 moves toward the first bottom wall 2023 by the first connecting block 203, and the second connecting end 402 of the first connecting rod 40 moves toward the first wall 6041. Thus the second connecting block 603 continuously pushes the spring 6043, and the camera bracket body 602 moves away from the driver 201. When the second connecting block 603 moves to the middle of the second connecting rod 6044, the second protrusion 6031 moves to an end of the second connecting hole 4021 near the first connecting hole 4011.

Under the action of the driver 201, the first connecting block 203 continues to move toward the first bottom wall 2023 to press against the first bottom wall 2023. At the same time, the first connecting end 401 of the first connecting rod 40 continues to move toward the first bottom wall 2023 under the driving of the first connecting block 203, and the second connecting end 402 of the first connecting rod 40 continues to move toward the first wall 6041. The second connecting block 603 continues to push the spring 6043, and the camera bracket body 602 moves away from the driver 201, and is exposed out of the body 10 through the opening 1014. At this time, the first protrusion 2031 moves to an end of the first connecting hole 4011 away from the second connecting hole 4021, and the second protrusion 6031 moves to an end of the second connecting hole 4021 away from the first connecting hole 4011.

In some embodiments, when the camera module 30 is to be received in the body 10, the screw rod 204 can be rotated by the driver 201 to drive the first connecting block 203 toward the top wall 2021, until the first connecting block 203 meets the top wall 2021. At the same time, the first connecting end 401 of the first connecting rod 40 moves toward the top wall 2021 under the driving of the first connecting block 203, and the second connecting end 402 of the first connecting rod 40 moves to the second wall 6042. The second connecting block 603 moves toward the second wall 6042 and presses against the second wall 6042 to push the connecting portion 604. Then, the camera bracket body 602 is pushed by the connecting portion 604 toward the driver 201, and is received in the body 10 through the opening 1014.

In the electronic device 100, the first connecting rod 40 makes the connection between the driving component 20 and the camera assembly 60. The camera assembly 60 is received in the body 10, to improve the screen-to-body ratio, but can be deployed and retracted as required.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An electronic device, comprising:
   a body; and
   a camera module comprising:
   a drive assembly comprising a driver and a first connecting block connected to the driver, the driver being configured to drive the first connecting block to linearly move toward or away from the driver;
   a camera assembly comprising a camera bracket and a second connecting block connected to the camera bracket; and
   a first connecting rod, wherein one end of the first connecting rod connects to the first connecting block, and the other end of the first connecting rod connects to the second connecting block; the first connecting block is configured to drive the first connecting rod to move in a circular motion during a linear movement of the first connecting block, thereby causing the camera bracket to be received in the body.

2. The electronic device of claim 1, wherein the first connecting rod comprises a first connecting end, a second connecting end, and a center hole, the first connecting end connects to the first connecting block, the second connecting end connects to the second connecting block, the center hole is between the first connecting end and the second connecting end, the first connecting rod is positioned in the body by the center hole, and the first connecting rod moves in the circular motion around the center hole.

3. The electronic device of claim 2, wherein the first connecting end defines a first connecting hole, the second connecting end defines a second connecting hole, and a first protrusion is protruded from a surface of the first connecting block, a second protrusion is protruded from a surface of the second connecting block, the first protrusion connects to the first connecting hole, the second protrusion connects to the second connecting hole.

4. The electronic device of claim 3, wherein the driving assembly comprises a bracket and a screw rod, the bracket is positioned in the body; the screw rod is positioned on the bracket, and passes through the first connecting block, the driver is positioned on the bracket and connected to the screw rod, so that the screw rod is rotatable relative to the bracket and the first connecting moves toward or away from the driver in a linear motion; and the first connecting rod is connected to the bracket by the center hole.

5. The electronic device of claim 4, wherein the driving assembly further comprises a guiding post, the guiding post is positioned on the bracket and passes through the first connecting block, the guiding post is parallel to the screw rod.

6. The electronic device of claim 1, wherein the camera bracket comprises a camera bracket body and a connecting portion, one end of the connecting portion connects to the camera bracket body, the second connecting block is positioned on an end of the connecting portion away from the camera bracket body.

7. The electronic device of claim 6, wherein the connecting portion comprise a first wall, a second wall, a spring, and a second connecting rod, one end of the second connecting rod connects to the first wall, and the other end of the second connecting rod connects to the second wall; the first connecting rod passes through the second connecting block, the second connecting block slides relative to the second connecting rod, the spring wraps the second connecting rod and is located between the first wall and the second connecting block.

8. The electronic device of claim 3, wherein the first connecting hole and the second connecting hole are strip-shaped.

9. The electronic device of claim 1, wherein the driver is a stepping motor.

10. The electronic device of claim 1, wherein the body comprises a housing and a display screen, the display screen is positioned on the housing, the housing defines an opening, the display screen and the opening are positioned on difference surfaces of the housing, the camera bracket is movably received in the body through the opening.

* * * * *